April 30, 1963  R. G. WEBSTER  3,087,180
POWER SWEEPER

Filed Nov. 29, 1961  2 Sheets-Sheet 1

INVENTOR.
ROBERT G. WEBSTER
BY
ATTORNEYS

April 30, 1963  R. G. WEBSTER  3,087,180
POWER SWEEPER
Filed Nov. 29, 1961  2 Sheets-Sheet 2

INVENTOR.
ROBERT G. WEBSTER
BY
ATTORNEYS ent Office 3,087,180
Patented Apr. 30, 1963

3,087,180
POWER SWEEPER
Robert G. Webster, Muskegon, Mich., assignor to Wagoner Webster, Inc., Muskegon Heights, Mich., a corporation of Michigan
Filed Nov. 29, 1961, Ser. No. 155,645
10 Claims. (Cl. 15—79)

This invention relates to automotive vehicles, and more particularly to self-propelled power sweepers.

Maneuvering heavy-duty, industrial, automotive vehicles weighing several hundred pounds is a constant problem to operators thereof, and accordingly to employers of the operators. If a unit maneuvers clumsily and therefore requires considerable effort on the part of the operator, such equipment simply is not used as often as necessary. Typical of this equipment is a heavy-duty power sweeper for industrial use, gasoline stations and the like. If such equipment has built therein a conventional steering mechanism to overcome the maneuvering problem, the cost thereof becomes prohibitive.

Moreover, optimum handling of such vehicles not only requires steering ease, but also stopping ease and the ability to be reversed quickly and with little effort. Conventional heavy-duty sweepers are known to be extremely difficult and cumbersome to reverse since the brush and its guard among other things, drag along the ground surface. If power reverse is built into the mechanism by providing a transmission, the cost again becomes prohibitive. Not only do dragging brushes impede handling ease of the sweeper, but this also causes excessive brush wear. The few conventional sweepers possessing vertical brush adjustment means are convenient only for accommodating brush wear and not for practical rapid lifting and lowering of the brush during sweeper operation.

It is therefore an object of this invention to provide an intermediate sized automotive vehicle having a novel mechanism enabling rapid steering, and causing complete maneuverability with little effort. The components for the mechanism enabling handling ease are few and relatively inexpensive. The steering mechanism enables the utilization of the powered driving wheels to achieve this operation.

Another object of this invention is to provide a vehicle in which a novel, relatively simple mechanism may serve to either steer the vehicle, or to disengage both driving wheels to stop the machine as desired. The vehicle may thus be quickly, repeatedly, and almost effortlessly reversed during operation.

It is still a further object of this invention to provide a novel heavy-duty sweeper wherein the sweeping brush can be quickly elevated from sweeping engagement with the floor in a matter of seconds. The brush may further be elevated simultaneously with elevation of the driving wheels to allow handling ease, and reverse movement by a minimum of manual effort.

These and other objects of this invention will be apparent upon studying the following specification in conjunction with the drawings in which.

Basically, the invention comprises an automotive vehicle having drive wheels on opposite sides of the vehicle, said drive wheels each including elevating means, preferably a dolly wheel, capable of lifting the respective drive wheels off the ground surface. The drive wheels may be lifted independently of each other to allow pivotal steering of the vehicle by continued operation of the opposite drive wheel. The two dolly wheels adjacent the respective drive wheels are each operably linked to a separate shifting handle extending upwardly at the rear of the vehicle. Simultaneous shifting of both handles and dolly wheels elevates both drive wheels to stop the vehicle. It may then be rolled about manually in any direction as desired. When the novel arrangement is used on a power sweeper, raising the drive wheels also causes elevation of the sweeping brush to reduce brush wear and allow effortless sweeper maneuvering.

Figure 1:
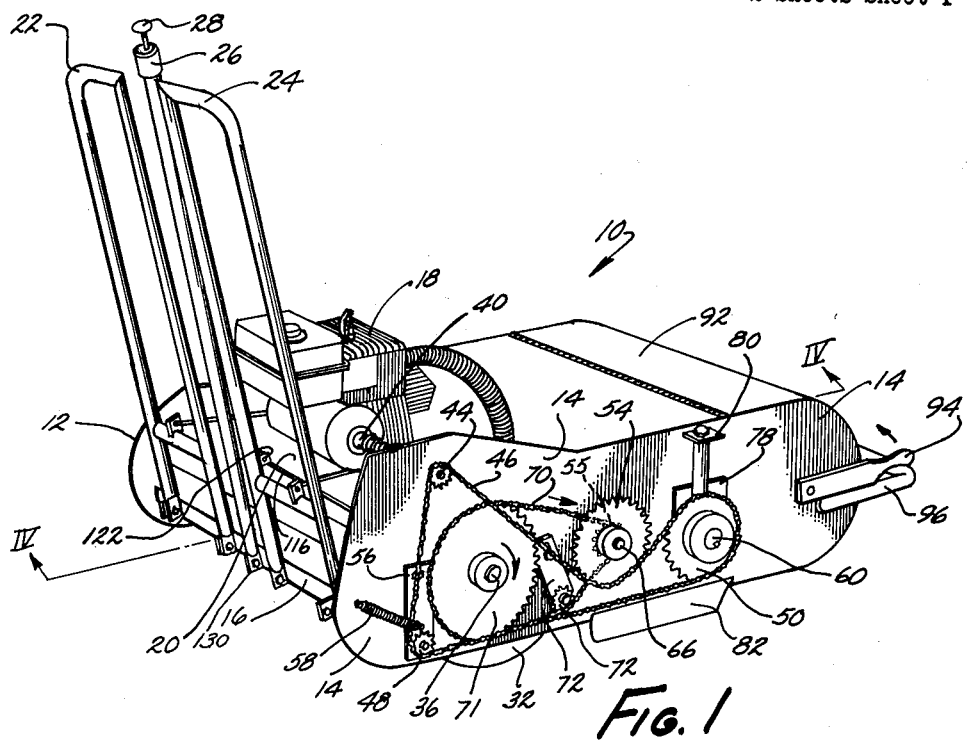
FIG. 1 is a perspective view of the novel sweeper mechanism.

Referring now to FIG. 1, the automotive vehicle 10 is here illustrated in the form of a heavy-duty power sweeper. This sweeper has a frame including a pair of side panels 12 and 14 and a plurality of cross frame elements such as rear element 16 preferably welded between the panels. An engine 18 is mounted upon platform 20 secured between the side panels 12 and 14. Pivotally attached to frame element 16 is a pair of control handles 22 and 24, and a motor clutch handle 26. A throttle 28 extends through handle 26 to engine 18.

Supporting the rear of the vehicle is a pair of drive wheels 32 and 34 mounted on axle 36. The axle extends through the side panels and is also attached to the frame by central bearing 160. Drive shaft 40 of motor 18 operates through clutch 42 to rotate sprocket 44 in a counterclockwise direction as viewed in FIG. 1. Chain 46 is driven counterclockwise by sprocket 44 around sprockets 48, 50 and 54. Sprocket 48 is mounted on pivotal plate 56 biased by tension spring 58 to constantly hold the chain 46 tight. Rotation of sprocket 50 in the counterclockwise direction rotates shaft 60 upon which an elongated cylindrical sweeping brush 62 is mounted. Since sprocket 50 is mounted upon movable plate 78 which is vertically adjustable with respect to platelet 80 affixed to panel 14, sprocket 50, and shaft 60 may be vertically adjusted to lower the brush 62 in accommodation of wear. The brush may also include a conventional side guard 82 made of rubber or the like.

Sprocket 54 is mounted to panel 14 on shaft 66 and drives a second smaller sprocket 55 mounted between sprocket 54 and panel 14. The second chain 70 is thus driven in a clockwise direction by smaller sprocket 55 to move around idler sprocket 72 mounted upon adjusting plate 74 and sprocket 71. Clockwise movement of chain 70 therefore drives sprocket 71 clockwise to rotate shaft 36 upon which the drive wheels 32 and 34 are mounted.

Figure 5:
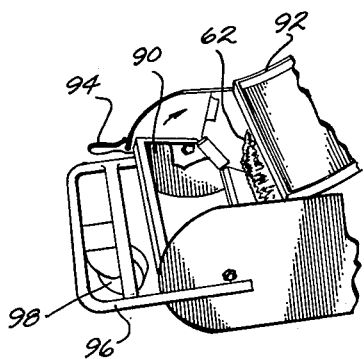
FIG. 5 is a fragmentary perspective view of the front of the novel sweeper.

The front of the sweeper mechanism includes a rotatable dump bucket 90 (FIG. 5) to receive debris from revolving brush 62, and normally covered with pivotal cover 92. It may be dumped by movement of handle 94 as indicated by the arrow in FIG. 1. Attached to the front of the sweeper is a combination bumper and front wheel support 96 beneath which pivotal caster wheel 98 is mounted.

Figure 3:
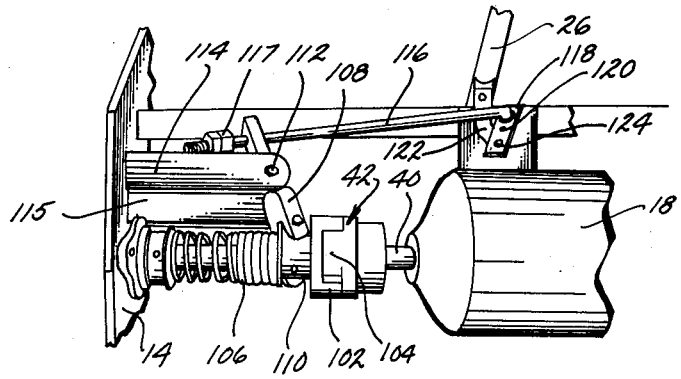
FIG. 3 is a fragmentary perspective view of the motor clutching arrangement.

The motor clutch assembly illustrated in FIG. 3 includes a conventional clutch having pairs of intermeshing teeth 102 and 104 biased together by compression spring 106 between side panel 14 and clutch 42. To release the clutch, and thus prevent the drive shaft 40 of the motor 18 from driving the sprocket 44, fork 108 is provided. It is pivotally attached to collar 110, and pivotally mounted at 112 intermediate its ends between brackets 114 and 115 affixed to panel 14. The butt end of the fork includes a transverse opening through which rod 116 extends and is prevented from removal by nuts 117. The rod is pivotally mounted at its other end to one end of plate 118. Link 118 swivels about attachment 120 to the frame. Arm 122 is pivotally attached to end 124 of link 118. The opposite end of arm 122 is attached to handle 26 above the pivotal mounting axis of handle 26 on cross frame member 16 at 130 (FIG. 1). Thus, by pulling backwardly on handle 26 to pivot it at 130, arm 122 is pulled backwardly to rotate link 118 clockwise around pivotal point 120. This pulls rod 116 to the right (FIG. 3) which then pivots fork 108 about 112 to compress spring 106 and disengage the clutching teeth. During normal operation this clutch 42 is continually engaged with maneuvering of the vehicle being effected through driving wheels 32 and 34.

In order to release the driving wheels 32 and 34 either individually or simultaneously from the driving surface, a tubular sleeve 138 is rotatably mounted around drive shaft 36 between wheels 32 and 34. Welded to one end of the sleeve is a pair of support brackets 140 and 142, and to the other end a second pair 144 and 146. Between each pair of brackets is mounted a dolly wheel 150 and 152. To the upper end of bracket 142 on the opposite side of sleeve 138 from dolly wheel 150 is connected a rod 153. The other end of the rod is connected to cross member 23 of the left handle 22. A similar rod 154 is connected between the upper end of bracket 146 and cross member 25 of the right handle 24. Bearing 160 is rotatable around sleeve 138 and does not interfere with rotative movement of the sleeve on axle 36. In order to obtain independent operation of the two ends of the sleeve 138 to facilitate independent operation of the dolly wheels 150 and 152 as explained herein, sleeve 138 is split in the center inside bearing 160.

*Operation*

Figure 4:
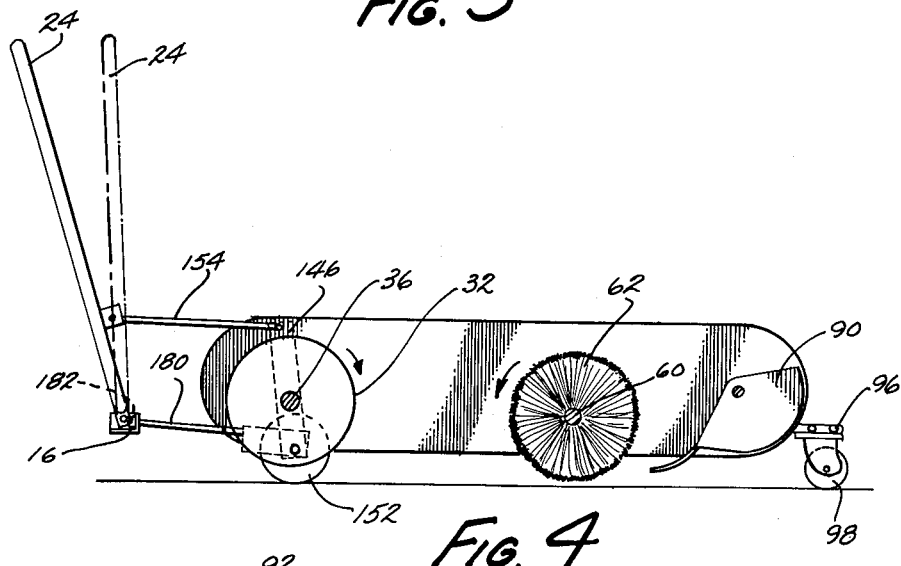
FIG. 4 is a sectional elevational view of the sweeper taken on plane IV—IV of FIG. 1.

To utilize the automotive vehicle as a sweeper, the engine 18 is started and clutch means 42 is engaged by pushing clutch handle 26 ahead. This pushes arm 122 ahead to rotate link 118, shift rod 116 to the left as viewed in FIG. 3, and thereby pivots fork 108 to release the compression spring 106 and engage teeth 102 and 104. This enables motor drive shaft 40 to rotate sprocket 44 and thus chain 46 as indicated by the arrows in FIG. 1. By so doing the brush is driven in a counterclockwise direction to sweep debris into catch bucket 90. The drive wheels 32 and 34 are simultaneously driven in a clockwise direction by chain 70 to move the device forwardly. If the brush is too high, plate 78 is adjusted downwardly. The clutch 42 may be engaged while both driving wheels are elevated off the driving surface if desired. This is done by first pulling backwardly on both handles 22 and 24 to pivot the dolly wheels in a downward, counterclockwise direction. Dolly wheel 150 is shown partially pivoted in FIG. 2. In FIG. 4 both dolly wheels are shown completely down. The resting position for the dolly wheels is slightly past a vertical plane drawn through axle 36. The dolly wheels are prevented from moving further counterclockwise by a pair of stop members constituting rods 180 and 181 which extend through cross frame element 16 and include nuts 182 on the backside thereof which abut against the cross member 16 when the dolly wheels are fully down. When the dolly wheels are so positioned the driving wheels are held off the driving surface but continue to rotate due to the engagement of clutch 42. When it is desired to engage the driving wheels with the driving surface, both handles 22 and 24 are pushed forwardly as indicated in phantom in FIG. 4 and as indicated by handle 24 in FIG. 2, to raise the dolly wheels and lower the driving wheels unto the ground. Forward pivoting of handles 22 and 24 about their pivotal mounts on cross member 16 pushes rods 153 and 154 forwardly to rotate brackets 146, 144, 142 and 140 and thus the dolly wheels clockwise on sleeve 138 around axle 36. It should be noted that lowering of the frame and driving wheels also lowers brush 62 into sweeping relationship with the ground surface. The sweeper then moves ahead under its own power and sweeps up stones, metal, saw dust, dirt, etc. into dump bucket 90.

Figure 2:
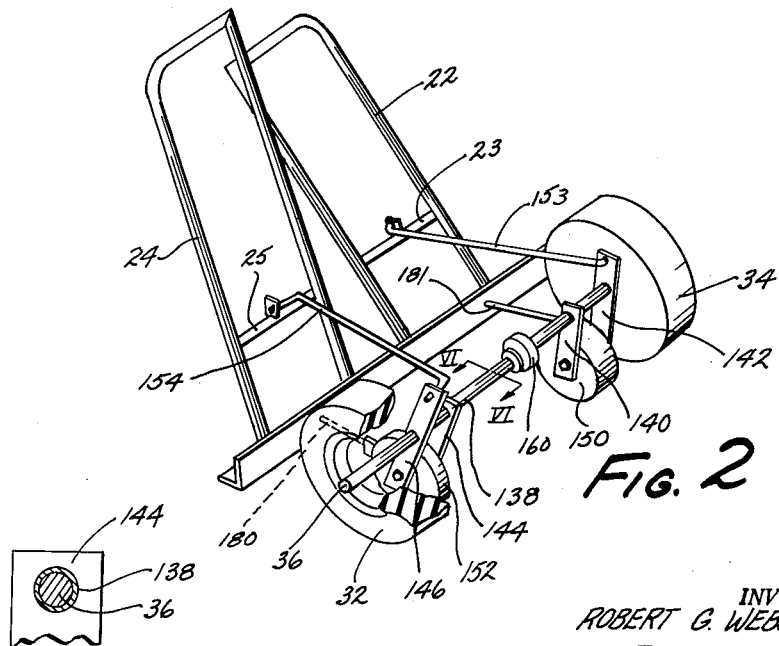
FIG. 2 is a fragmentary perspective view of the linkage forming part of the novel automotive vehicle.
Figure 6:
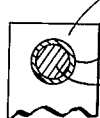
FIG. 6 is a fragmetnary sectional view of the rear axle and sleeve arrangement taken on plane VI—VI of FIG. 2.

When it is desired to turn the sweeper to the left, the left handle 22 is pulled backwardly to lower the dolly wheel 150 and raise the left drive wheel 34 off the floor. When this is done right drive wheel 32 continues to contact the floor, thereby moving the vehicle pivotally to the left around dolly wheel 150. This is illustrated in FIG. 2. As soon as the unit has turned far enough, handle 22 is again pushed forwardly to lower driving wheel 34 unto the surface, and the vehicle again moves straight ahead. If it is desired to turn the unit to the right, handle 24 is pulled toward the operator to engage dolly wheel 152 with the surface and lift driving wheel 32 therefrom in a similar manner. If it is desired to back the unit up, both handles are pulled backwardly to raise both driving wheels off the ground surface. This also substantially raises the brush 62 out of sweeping engagement with the surface. The unit may then be easily pulled backwardly manually. Since wheel 98 is pivotal the unit may also be manually swiveled about on the two dolly wheels and the front wheel. When the entire surface area involved has been swept, dump bucket 90 is rotated to discharge its contents.

Various obvious modifications may occur to those in the art upon studying the foregoing specification and drawings. Such modifications within the preventive principles taught are deemed part of this invention which is not to be limited to the illustrative form depicted but only by the scope of the appended claims and the reasonably equivalent structures thereto.

I claim:

1. A power surface sweeper comprising: a frame; motive support means under said frame and including drive means associated with opposite sides of the frame; adjustable rotatable sweeper brush means suspended under said frame and adapted to contact the surface to be traversed; prime mover motor means operably connected to said drive means and said sweeper brush means; separate control means associated with said drive means on both sides capable of independently releasing either of said drive means from its driving action, thereby facilitating turning of said vehicle, and capable of releasing both of said drive means from driving action and said sweeper brush means from sweeping action on said surface thereby allowing the sweeper to be readily stopped, or moved manually, with minimum frictional resistance even while the prime mover operates.

2. An automotive vehicle for traversing a surface comprising: a frame; motive support means under said frame including separate drive means associated with opposite sides of said frame and in operative engagement with said surface; prime mover means operably connected to said drive means; independent control means associated with each of said separate drive means on opposite sides of said frame; said control means being capable of selectively lifting either of said drive means from operative engagement with said surface to thereby cause said vehicle to be pivotally turned.

3. An automotive vehicle for traversing a surface comprising: a frame; rolling support means generally beneath said frame including a pair of drive wheels; prime mover means operably connected to said drive wheels; an independent elevating means adjacent each of said drive wheels; each of said elevating means being movable from an inactive position to an elevating position holding the drive wheel out of contact with said surface, whereby by movement of individual elevating means said vehicle may be steered over said surface due to contact of only one drive wheel therewith, and by movement of both of said elevating means said vehicle may be halted in its traverse.

4. An automotive vehicle for traversing a surface comprising: a frame; a plurality of wheel support means under said frame; said support means including a pair of drive wheels on opposite sides of said vehicle; prime mover means operably connected to said drive wheels; a shiftable dolly wheel mounted adjacent each of said drive wheels and movable between a position out of contact with said surface and a position in contact with said surface; said dolly wheel in said contacting position elevating the adjacent drive wheel out of contact with said surface, whereby by independent operation of said dolly wheels, said vehicle may be pivotally steered, and by simultaneous operation and downward movement of said dolly wheels said vehicle may be halted.

5. An automotive vehicle for traversing a surface comprising: a frame; an engine mounted to said frame; first and second drive wheel means on opposite sides of said frame operably connected to said engine; at least one additional rolling support element under said frame to provide at least three point support; a pair of handle means projecting upwardly at the rear of said frame; a shiftable pivotal support means adjacent each of said drive wheels movable into contact with said surface to elevate said drive wheels, and out of contact with said surface to lower said drive wheels; each of said handles being operably linked to one of said pivotal support means whereby said support means may be independently shifted into contact with said surface by independent shifting of said handles to steer said vehicle.

6. The apparatus in claim 5 wherein said pivotal support means are capable of raising said drive wheels completely out of contact with the ground individually or simultaneously with shifting of said handles whereby said vehicle may be steered or halted.

7. A power sweeper for collecting debris from a surface to be traversed, comprising: a frame; power motor means; rolling support means beneath said frame including drive wheel means operatively connected to said motor; powered sweeper brush means mounted to said frame adjacent said surface and operatively connected to said motor; shiftable frame-elevating means mounted beneath said frame and capable of being shifted into a position out of contact with said surface and into a position in contact with said surface; said elevating means in said contacting position causing at least the portion of said frame to which said drive wheels and said brush means are mounted to be elevated whereby said sweeper may be halted and said brush elevated from a vigorous brushing position.

8. A power sweeper for collecting debris from a surface to be traversed comprising: a frame; power motor means attached to said frame; a pair of drive wheel means mounted adjacent opposite sides of said frame; at least one swiveling support wheel adjacent the front of said frame to provide at least three point support; sweeper brush means operably mounted to said frame between said front wheel and said drive wheels; means operably connecting said power motor means to said drive wheel means and said sweeper brush means; shiftable dolly wheels adjacent said drive wheels capable of being shifted from a position out of contact with said surface to a position in contact with said surface; said dolly wheels in said latter position causing the said frame to be substantially elevated to simultaneously elevate said drive wheels out of contact with said surface and raise said brush means from its sweeping engagement with said surface; and shiftable handle means extending upwardly at the rear of said frame and operatively linked to said dolly wheels to provide control of said drive wheels and brush means.

9. A power sweeper for collecting debris from a surface to be traversed comprising: a frame; power motor means attached to said frame; a pair of drive wheel means mounted adjacent opposite sides of said frame at the rear thereof; at least one swiveling wheel adjacent the front of said frame to provide at least three point support; revolving sweeper brush means operably mounted to said frame between said front wheel and said rear drive wheels; means operably connecting said power motor means to said drive wheel means and to said sweeper brush means; a shiftable dolly wheel adjacent each of said drive wheels capable of being shifted from a position out of contact with said surface to a position in contact with said surface; each of said dolly wheels when placed in said contact position causing the adjacent drive wheel to be elevated out of operative engagement with said surface to allow said sweeper to be pivotally steered; said dolly wheels when both placed in contact with said surface causing both of said drive wheels to be out of operative engagement with said surface and causing said brush means to be elevated out of brushing relationship with said surface.

10. The apparatus in claim 9 wherein a pair of handles is operably linked to said dolly wheels to provide operator control of said sweeper.

References Cited in the file of this patent

UNITED STATES PATENTS

| | | |
|---|---|---|
| 998,517 | Humm | July 18, 1911 |
| 1,779,583 | Blyden Burgh | Oct. 28, 1930 |
| 1,871,639 | Waite | Aug. 16, 1932 |
| 2,033,030 | Hough | Mar. 3, 1936 |
| 2,041,654 | Dame | May 19, 1936 |
| 2,194,297 | Drumm | Mar. 19, 1940 |
| 2,263,722 | Drumm | Nov. 25, 1941 |
| 2,268,059 | Parker et al. | Dec. 30, 1941 |
| 2,275,356 | Funk | Mar. 3, 1942 |
| 2,464,980 | Kuehn | Mar. 22, 1949 |
| 2,689,367 | Parker | Sept. 21, 1954 |
| 2,749,996 | Parker et al. | June 12, 1956 |

FOREIGN PATENTS

| | | |
|---|---|---|
| 491,330 | France | May 30, 1919 |
| 551,996 | Great Britain | Mar. 18, 1943 |